Oct. 30, 1962  A. E. HUSTON  3,060,807
KERR CELL SHUTTER ASSEMBLY
Filed Sept. 22, 1959

INVENTOR
ALEXANDER EDWARD HUSTON
By:
ATTORNEYS

 …

3,060,807
KERR CELL SHUTTER ASSEMBLY
Alexander Edward Huston, Reading, England, assignor to United Kingdom Atomic Energy Authority, London, England
Filed Sept. 22, 1959, Ser. No. 841,554
Claims priority, application Great Britain Sept. 24, 1958
2 Claims. (Cl. 88—61)

This invention relates to high speed cameras. High speed cameras, particularly the rotating mirror-streak and cine cameras, have become established equipment for the photography of rapid events. They may be designed to take only single photographs or a series of photographs, and may have a stationary or moving film. The exposure time must be kept very short, and electro-optical shutters have been proposed for this purpose.

The high speed cameras to which this invention relates have electro-optical shutters of the Kerr cell type in which a transparent cell is filled with a fluid (generally nitro-benzene). The fluid has the power of splitting plane polarised light into two components when a high voltage is applied across two electrodes immersed in it. When the cell is placed between two crossed poralisers, light will not pass through the system until the voltage is applied. The light-transmitting qualities of a nitro-benzene cell are not good, being only about 0.04 to 0.15, and other liquids, e.g. phenyl cyanide, have been proposed in an attempt to improve the performance.

The voltage which is to be applied to the cell is about 30 to 50 kv. per sq. cm. and this has, of course, to be applied only for the time needed for the exposure. A single pulse can fairly easily be applied to a cell to give an exposure down to 0.1 micro-second, but the application of a train of short pulses is more difficult and the difficulty increases sharply as the number of pulses per second increases.

One reason for the increase in difficulty is the large increase in energy required by the electrical circuits at present used to produce a sequence of pulses in a Kerr cell.

Up to now the greatest framing rate achieved in practice is about $2 \times 10^6$ per second.

This invention produces a high speed camera having an electro-optical shutter which can operate at a framing rate above $2 \times 10^6$ per second and has only a relatively low electrical energy consumption.

The invention consists in a high speed camera having an electro-optical shutter of the Kerr cell type, wherein the electrodes of the Kerr cell are connected across an inductance to form a parallel resonant circuit, means being provided to energise the circuit at substantially its fundamental resonant frequency.

The means for energising the circuit may comprise a valve having the circuit connected in its anode circuit.

In a preferred form of the invention the parallel resonant circuit is adapted to have a further resonant frequency of at least one harmonic of the fundamental.

The invention will be better understood with reference to the accompanying drawings wherein.

Figure 1:
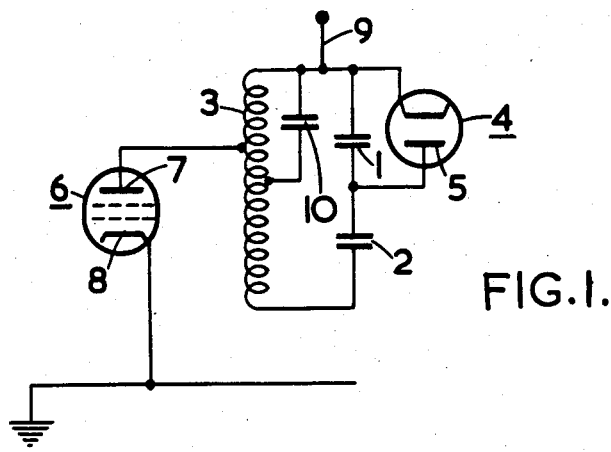
FIG. 1 is a circuit diagram of a parallel resonant circuit wherein the potential applied to the Kerr cell varies in unidirectional manner.

In FIGURE 1 a Kerr cell 1 (whose capacity is in the region 60 pf.) is placed in series with an auxiliary capacitor 2 (of about 500 pf.). The cell 1 and the capacitor 2 are connected in series across an inductance 3. A diode 4 is connected across the cell 1 with its anode 5 tapping the connection between cell 1 and capacitor 2. A radio frequency amplifier valve 6 has its anode 7 connected to the inductance 3 and its cathode 8 connected to earth. A 3 kv. input line 9 is connected between the inductance 3 and the cell 1. A capacitor 10 is connected in parallel with cell 1 to capacitor 2 and taps the inductance 3 at an intermediate point in the inductance.

Figure 2:
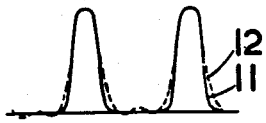
FIG. 2 illustrates the relationship between the mode of oscillation of the circuit in FIG. 1 and the operation of the cell.

In FIGURE 2 the solid line 11 illustrates the light transmitting characteristic of the cell under the influence of an applied voltage illustrated by dotted line 12. The voltage illustrated by 12 can be represented by the equation:

$$v = 0.48 \, V. \, (\sin wt. - 0.44 \cos 2 wt. + 0.65)$$

wherein $v$ is the varying voltage applied to cell 1, $V$ is the voltage required to open the cell 1 completely, $w$ is the angular frequency of the oscillations and $t$ is time.

Figure 3:
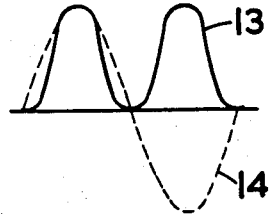
FIGS. 3 to 5 illustrate the relationship between three modes of oscillation and the shutter characteristics of a cell.

In FIG. 3 the solid line 13 shows the light transmitting characteristics of a cell under the influence of an applied voltage represented by dotted line 14. The applied voltage follows a simple sinecurve having the equation:

$$v = V \sin wt.$$

The circuit of FIG. 1 would be modified to produce these sinusoidal oscillations by removal of the capacitor 2, the diode 4 and the capacitor 10.

Figure 4:
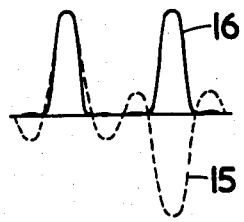

In FIG. 4 the varying voltage 15 is governed by the equation:

$$v = \frac{V}{2} (\sin wt. - \sin 3 wt.)$$

The light transmission characteristics of the cell are shown by line 16. The circuit illustrated in FIG. 1 would be modified to oscillate in this manner by removal of the capacitor 2 and the diode 4.

Figure 5:
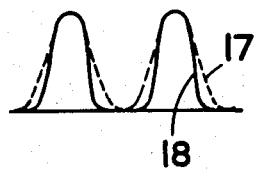

In FIG. 5, the varying voltage represented by line 17 is governed by the equation:

$$v = \frac{V}{2}(1 + \sin wt.)$$

The light transmitting characteristics of the cell under the influence of the applied voltage 17 are shown by line 18. The circuit shown in FIG. 1 would be modified to oscillate in this manner by removal of capacitor 10.

The circuit of FIG. 1 operates as follows:

Valve 6 is operated as a class C R.F. power amplifier. It is fed on its control grid with a signal of the fundamental frequency and as with any class C amplifier the anode current is rich in harmonic content. The required harmonic is accentuated by the auxiliary resonant circuit formed by the capacitor 10 and the portion of the inductance 3 across which it is connected. The auxiliary circuit is tuned to accentuate the second harmonic but is kept slightly off tune since a cosine function is needed. The auxiliary capacitor 2 is charged by diode 4 to the peak value of the alternating potential across the circuit. It can be seen that the frequency of light modulation, that is, the rate of pulsing of the cell 1, is in this case equal to that of the applied alternating potential. The cell potential varies in a unidirectional manner so that power factor losses are minimised. The reduction in power factor losses is particularly useful at frequencies above 2 mc./s. It can also be seen that it is necessary to produce only about half the voltage required to open the cell completely. The $e/f$ ratio is approximately 1/4.5 where $e$ is the exposure time and $f$ is the frame interval.

The alternating potential need be applied to the cell 1 only for the duration of the photographic recording, which may be of the order of 20 microseconds. Thus the valve 6 need be pulsed for this period only, enabling a high power output to be obtained with a very small power pack.

The sinusoidal oscillations of FIG. 3 require an amplitude equal to that required to open the cell completely. The frequency of the light modulation is, however, twice that of the applied potential. The $e/f$ ratio in this case is approximately 1/2.

The oscillations shown in FIG. 4 result from the negative superimposition of the third harmonic upon the fundamental. The frequency of the light modulation is twice that of the applied potential and the peak voltage must be equal to that required to open the cell completely. the $e/f$ ratio is approximately 1/4. The auxiliary circuit accentuating the third harmonic must, of course, be exactly in tune with the main resonant circuit.

The oscillations shown in FIG. 5 are unidirectional, thus reducing power factor losses, and the peak voltage of the applied alternating potential need be only about half that required to open the cell completely. The frequency of light modulation is equal to that of the applied frequency and the $e/f$ ratio is approximately 1/3.

A camera using an electro-optical shutter operating as illustrated in FIG. 5, the cell capacity being 60 pf. and the peak applied voltage being 15 kv., and frequency 10 mc./s., can make a series of exposures of about 35 millimicroseconds.

I claim:

1. An electro-optical shutter for a high-speed camera which comprises a Kerr cell whose electrodes are connected across an inductance to form a parallel resonant circuit, a driver electronic valve having its anode connected to a tapping along the said inductance and its cathode connected to earth, and a high potential lead connected to one electrode of the Kerr cell, a capacitor being connected in series with said Kerr cell and a diode being connected in parallel across said Kerr cell.

2. A high speed camera shutter as claimed in claim 1 wherein a capacitor is connected in parallel across part of the inductance.

References Cited in the file of this patent
UNITED STATES PATENTS

| | | |
|---|---|---|
| 1,732,874 | Zworykin | Oct. 22, 1929 |
| 1,834,117 | Wright | Dec. 1, 1931 |
| 1,861,039 | Whitson | May 31, 1932 |
| 2,634,366 | Schimpf | Apr. 7, 1953 |

OTHER REFERENCES

Jones, "High Speed Photography," Chapman and Hall Ltd., London, 1952 ed., pages 14 and 15 relied upon.